Figure 1:
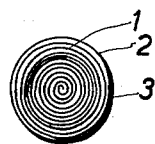

Sept. 26, 1961 W. SIMON 3,001,359
METHOD OF PRODUCING THREADS OF FOAMED MATERIAL
Filed Nov. 4, 1955 2 Sheets-Sheet 1

INVENTOR.
WERNER SIMON
BY  Elmer P. Rucker

ATTORNEY

Sept. 26, 1961     W. SIMON     3,001,359
METHOD OF PRODUCING THREADS OF FOAMED MATERIAL
Filed Nov. 4, 1955     2 Sheets-Sheet 2
FIG.10
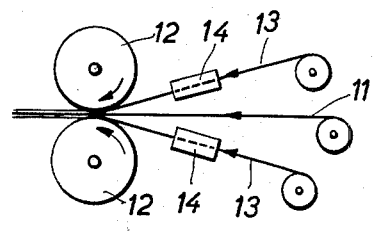
FIG.11
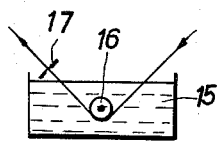
FIG.12
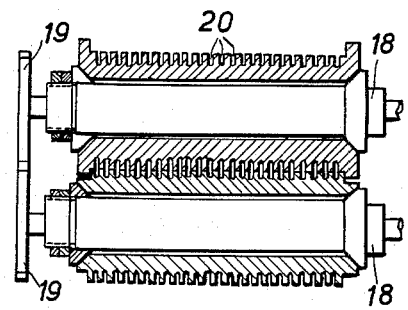
FIG.13
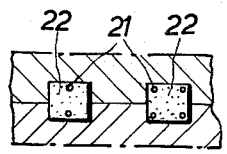
FIG.14a
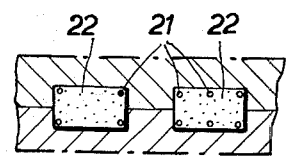
FIG.14b
FIG.15
FIG.16     FIG.17
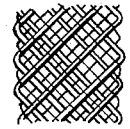
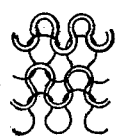
FIG.18
FIG.19
INVENTOR.
WERNER SIMON
BY Elmer P. Rucker
ATTORNEY United States Patent Office 3,001,359
Patented Sept. 26, 1961

3,001,359
METHOD OF PRODUCING THREADS OF FOAMED MATERIAL
Werner Simon, Wuppertal-Vohwinkel, Germany, assignor, by mesne assignments, to Ceolon-Gesellschaft K. E. Merckle, Leonberg, Wurttemberg, Germany
Filed Nov. 4, 1955, Ser. No. 545,054
Claims priority, application Germany Nov. 4, 1954
7 Claims. (Cl. 57—157)

The present invention relates to a process for making new threads from foamed materials. The invention is also concerned with new fabrics produced from the threads of foamed material and with methods for making these new fabrics.

The deficiencies inherent in natural wool have led to efforts to replace natural wool by other synthetic materials. This aim could not be accomplished since it was not possible heretofore to imitate the structure of the natural wool fiber.

Wool shows the disadvantage of not being fast to boiling and of being stretched in washing so that the wool thread or a fabric or texture made therefrom loses its shape. Besides, natural wool yields only comparatively short fibers which soil easily and which requires careful washing.

An object of the present invention is to provide threads having the valuable properties of natural wool, which are resistant to gasoline and oil and are at the same time free from the disadvantages associated with wool. Another object is to provide fabrics made from these new threads. The elasticity of these fabrics is limited to a minimum, they are, therefore, far from being rubber-like. In contrast to fabrics made of porous rubber, textiles made from the new threads consist of foamed material which possesses open pores. On account of its capillary action the textiles are open to diffusion processes with the surrounding air. Still another object is to provide fabrics which are noncreasing and nonshrinking. Further objects will appear hereinafter.

It has now been found that threads of foamed material can be produced from sheet-like structures, such as plates or foils, of foamed plastics by cutting them with a suitable cutting device, said sheet-like structures having the thickness and the length of the thread to be formed. Although the sheet-like structures may be cut as such, a preferred embodiment of the invention comprises winding up a sheet-like structure of foamed material to form a roll, securing the roll by means of a bandage or binder, cutting the roll into slices, and unwinding the slices to form threads.

In carrying out the process of the invention, sheet-like structures, such as plates or foils, of foamed plastics are used as starting materials. The thickness of the sheet-like structures is chosen in proper relation to the desired thickness of the thread, it being preferable to start with plates of a thickness of 0.5–30 mm. The length of the plates, which can be made by welding several plates in known manner, depends upon the desired thread length.

A plate of the aforedescribed kind is tightly rolled up and secured in this position by a bandage or a binder. Suitable bandages for this purpose are for instance elastic, natural or synthetic rubber plates of a thickness and strength approximately equal to the foamed material plate. These plates are applied to the foamed material roll in such a manner that one end of the rubber plate is bonded to the foamed material surface, the rubber plate is tightly wound around the roll and the end of the rubber plate is bonded to the rubber surface.

According to another embodiment of the invention the foamed material roll can be secured by coating with a binder; for this purpose there are suitable the finishing, sizing and hardening agents which are customarily employed in the textile industry, thus, for instance, starch, dextrin, casein or other albuminous products.

Slices having the desired width of thread, which is preferably equal to the thickness of the thread, can be cut off the roll by means of circular knives, band knives, wires and like devices. Thereupon, the rubber strips holding the slices together are detached or the binder is removed by boiling in water or other suitable means. The slices are then unrolled so that threads of foamed material result. It is possible to cut from the roll single slices in succession or to divide the entire roll into slices of the desired thickness by appropriate arrangement of a plurality of knives.

The slices can also be obtained by thermal cutting with electrically heated knives or heated wires; this method allows a few slices to be made at first or the entire roll to be cut into a plurality of slices. The cutting devices are generally heated to temperatures of 150–380° C., it being understood that a higher cutting velocity requires an increase in temperature. As indicated above, it is also possible for the plate or foil of foamed material to be cut immediately into threads without rolling up the plate or foil to form a roll provided that the knives or heated wires are appropriately arranged.

In many cases, the tensile strength of the threads of foamed materials that are ordinarily used is insufficient for using same in the preparation of textiles for instance by weaving or knitting. In these cases the threads of foamed material are strengthened by threads of another material. Suitable threads for this purpose may comprise either natural substances (wool, cotton, linen, jute) or synthetic materials such as polyamides, polyesters, polyacrylonitrile and rayon. The threads of foamed material can be strengthened for instance by means of one or more parallel threads of another material and/or by winding such threads around the thread of foamed material and/or by twisting the thread of foamed material with a thread of another material.

The embodiments of the invention mentioned hereinbefore are further illustrated by means of the following figures without being restricted thereto.

Figure 2:
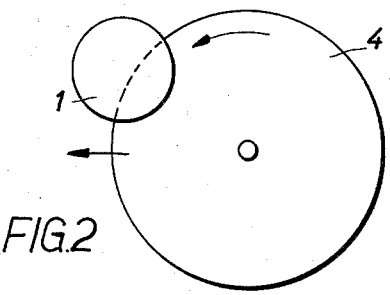
Figure 3:
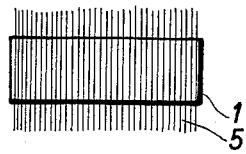
Figure 4:
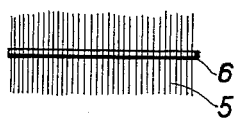
Figure 5:
Figure 6:
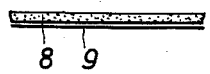
Figure 7:
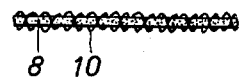
Figure 8:
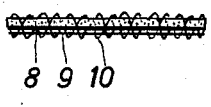
Figure 9:

FIGURE 1 shows the foamed material roll 1 and the rubber bandage 2, the ends of which are bonded together at the overlap 3. FIGURES 2 and 4 represent the cutting procedure, more specifically, FIGURE 2 shows the foamed material roll 1 and the circular knife 4 which cuts slices from the roll. FIGURE 3 represents another embodiment according to which the roll 1 shown in longitudinal section is cut into slices by a plurality of heated wires 5. In FIGURE 4 a foil of foamed material 6 is cut as such by a plurality of annealed wires 5. A slice 7 cut off the roll according to FIGURES 2 or 3 is unrolled to give a foamed material thread 8 as can be seen from FIGURE 5. FIGURES 6 to 8 show the resulting foamed material thread 8 strengthened by a parallel thread of another material 9 (FIGURE 6), with a thread 10 wound around the foamed material thread (FIGURE 7), and the foamed material thread 8 strengthened by a parallel thread of another material 9 and with a further thread 10 wound around them (FIGURE 8). FIGURE 9 shows the foamed material thread 8 twisted with another thread 11. Otherwise, strengthening the foamed material thread by another thread may be effected in any other desired manner, a representative is given in FIGURE 10. FIGURE 11 shows a foamed material foil with additional threads passing between cutter blocks. FIGURE 12 illustrates a vat containing a bonding agent, while FIGURE 13 is a side view, partly in section, of the cutter blocks. FIGURES 14a and 14b are sectional views of two grooved rollers. FIGURE 15 to FIGURE 19 illustrate the use of the threads in different types of fabrics.

The diameter of a thread of foamed material, which may have a cross section of for instance 2 x 2 mm., can be adjusted by tensile load. Thus, for instance, by stretching the thread to twice its original length, the diameter will be reduced to about half its value, stretching the thread to three times its original length will result in reduction to about a quarter of the original diameter. In this manner there can be obtained foamed material threads with any diameter practically required in the textile industry.

This has the advantage that it allows a convenient cutting of threads of a larger thickness than desired for working into a fabric or texture, moreover, it offers the possibility of making thinner threads than can be obtained by conventional cutting means; finally, the cutting process can be simplified by cutting a thread of uniform thickness, which can later be adjusted to any desired thickness, depending upon its contemplated use.

The threads of foamed material obtained according to the invention can be stretched to five times their original length without affecting their other properties. It is, of course, also possible to combine foamed material threads with other threads before the stretching procedure. Then, naturally, the amount of stretching is dependent on the properties of that other thread.

The stretched threads can be thermally aftertreated as such or after being combined with other threads whereby the stretched position is fixed. After the aftertreatment even threads that are not combined with other threads maintain their new length and their reduced cross section without losing their original properties.

The thermal aftertreatment of the thread is preferably carried out by passing the thread through a heated channel, hot air passage, by infra-red radiation or by passing over heated calenders, using temperatures of 60–380° C. The aftertreatment may be carried out within a very short time. Thus, the threads may move through a hot air passage at a velocity of 1 meter or less per second.

Another embodiment of the invention involves at the same time cutting and strengthening the thread by means of a thread of another material. For this purpose, a foamed material foil 11 is passed together with one or more threads 13 of another material between calibrated cutter blocks 12, as can be seen from FIGURE 11. The essential feature is that the foamed material foil is compressed when passed through the cutter blocks, and cut at the same time. The threads of another material being passed together between the blocks are thereby impressed into the foamed material thread. To achieve better bonding between the threads of different materials it is preferred to pass the threads of another material previously through the bonding devices 14. The device 14 may consist of a thermal heater or an open vat more specially shown in FIGURE 12, filled with a bonding agent 15. Any desired bonding agent is suitable for the purpose of the invention. FIGURE 12 furthermore shows a guide-roller 16 for appropriate conducting the thread and a means 17 which is arranged to strip excess bonding agent off the thread. The cutter blocks themselves are shown in side view in FIGURE 13. Two grooved rollers 18 are driven by spur wheels 19, the rollers being appropriately calibrated 20. FIGURES 14a and 14b are sectional views of two grooved rollers which can be designed as desired. As can be seen from the drawings, the shape and the position of the threads 21 of other material joining the foamed material threads 22 can be chosen at will.

The foamed material threads, preferably strengthened as described above, can be worked into textile fabrics or textures of any kind, alone or in conjunction with other textile materials, by processes commonly used in the textile industry, such as braiding, plaiting, weaving, knitting, lacing, hooking, interlacing, crocheting or knotting. It is possible to produce fabrics or textiles of any desired texture. The threads according to the invention may be used as warp thread or weft thread to produce woven goods and bands (FIGURE 15). FIGURE 16 gives a scheme to be followed when patterned fabrics are to be produced. It is also possible to obtain plaited textiles (FIGURE 17) or looped fabrics (FIGURE 18) such as crochet work, needle goods and knit fabrics. Furthermore, threads according to the invention may be used as filling threads (FIGURE 19) or for rashel goods (FIGURE 10).

It is possible to produce bands or fabrics having one surface made up of foamed material threads and the opposite surface made up of rayon or other threads. The surface formed by foamed material threads is fast to slipping. This property renders the threads of foamed material useful for making supports for clothing, waistbands, stockings, socks and the like. Besides, it is possible and sometimes advantageous to incorporate foamed material threads into the lower side of carpets and strips of carpeting or to use the foamed material threads to prepare supports, whereby these articles become fast to slipping.

The herein described threads can be worked into fabrics and textures according to all processes known in the textile industry. In order to produce colored threads of foamed material, foamed material foils may be dyed and then subjected to the herein described process. On the other hand, both the foamed material threads made according to the invention and the textile fabrics may be dyed by any conventional process. The threads and the fabrics or textures made therefrom can be washed at all temperatures commonly used in laundries and soil less readily than wool. Fabrics prepared from foamed material threads are as agreeable, heat-insulating and porous as woolen fabrics. Furthermore, they are light-weight goods with a wool-like smooth touch and appearance.

The invention is further illustrated by the following examples without being restricted thereto:

*Example 1*

A 1 m. broad, 100 m. long and 2 mm. thick foamed polyurethane plate is rolled up and covered with a 2 mm. thick rubber bandage, the ends of which are bonded together by any desired rubber adhesive. Slices having a thickness of 2 mm. are cut from this roll of foamed material by means of a rotating circular knife. After detaching the rubber bandage of foamed polyurethane and unrolling the slices, threads of 2 x 2 mm. cross section and 100 m. length result which are subsequently stretched to 3 times this length. The stretched threads are passed through a hot air passage at a velocity of 1 m. per second at 80° C. and are then covered with polyamide threads by winding the latter around the former.

The foamed polyurethane threads thus obtained can be worked into fabrics and textures of any kind by all the conventional methods used in the textile industry.

*Example 2*

A 1 m. broad, 150 m. long and 1.5 mm. thick foamed polyurethane plate is passed over heated wires which are arranged vertically to the moving direction of the plate and heated to 260° C. The wires are arranged and spaced from each other at a distance of 1.5 mm. so that a plurality of foamed polyurethane threads of 1.5 x 1.5 mm. cross section and 150 m. length result immediately. Upon winding threads around the foamed polyurethane threads they are stretched to five times their length. The stretched threads are passed through an infra-red radiation chamber at a velocity of 1 m. per second at 120° C. and can then be worked into fabrics and textures of any kind.

In the above examples polyurethane foam is used for convenience as the foamed material, but any foamed material of similar properties may be used in its place, including foamed rubber of spongy structure and foamed polyvinyl plastics.

The foamed materials are produced by conventional methods. Thus, polyurethane foam is obtained by reacting a polyisocyanate with a polyester containing free hydroxyl and/or carboxyl groups. When reacting a polyisocyanate with an hydroxyl polyester, a small amount of water is added to bring about carbon dioxide formation with excess polyisocyanate and the reaction is accelerated in known manner by addition of catalysts and surface active agents.

While certain representative embodiments and details have been shown for the purpose of illustrating this invention, changes and modifications may be made therein without departing from the spirit and scope of the invention.

What is claimed is:

1. A method for making threads of cellular polyurethane plastic which comprises winding a plastic sheet of the thread thickness into a roll of a plurality of layers which contact each other, substantially simultaneously securing said layers together with a binder, thereby forming a rigid roll of said cellular material, cutting said roll in a direction perpendicular to the axis of said roll to the desired width of thread to form a plurality of wound strips, and thereafter unwinding said strips into threads, said cutting exposing the pores in the thread.

2. The method of making threads from a sheet of cellular plastic material while avoiding substantial destruction of the cellular structure which comprises winding a sheet of cellular polyurethane plastic to form a roll of contacting layers of cellular plastic, cutting said roll in a direction substantially perpendicular to the axis thereof to form a plurality of wound strips, unwinding said wound strips, stretching the strip into a thread of lesser diameter, and heat-treating said stretched thread until it remains in its stretched position.

3. The process of claim 2 wherein said heat-treated thread is strengthened by winding a cellulosic thread of lesser diameter about said cellular plastic thread.

4. The method of making threads from a sheet of cellular plastic material while avoiding substantial destruction of the cellular structure which comprises winding a sheet of cellular polyurethane plastic to form a roll of contacting layers of cellular plastic, coating said formed roll with a binder thereby forming a rigid roll of said material, cutting said roll in a direction perpendicular to the axis of said roll to form a plurality of wound strips, and thereafter unwinding said strips into threads, said cutting exposing the pores in the thread.

5. The method as defined in claim 2 wherein said stretching does not exceed five times their unstressed length.

6. A process for making threads of cellular foamed plastic material which comprises cutting a sheet like structure of said plastic having the thickness and length of the threads to be formed along parallel lines spaced the desired width of the thread and throughout the length of the structure, said cutting forming threads of substantially uniform cross section, and strengthening each of said threads by winding a cellulosic thread of lesser diameter about said thread.

7. Process in accordance with claim 6 comprising stretching each of said threads into a thread of lesser diameter, and heat-treating said stretched thread until it remains in stretched position, and wherein said stretching and heat-treating occurs prior to the winding of said strengthening thread.

References Cited in the file of this patent

UNITED STATES PATENTS

| | | |
|---|---|---|
| Re. 24,514 | Hoppe et al | Aug. 12, 1958 |
| 1,566,727 | Brigham | Dec. 22, 1925 |
| 1,663,953 | Peabody | Mar. 27, 1928 |
| 2,017,444 | Page | Oct. 15, 1935 |
| 2,152,826 | Spencer | Apr. 4, 1939 |
| 2,200,946 | Bloch | May 14, 1940 |
| 2,268,160 | Miles | Dec. 30, 1941 |
| 2,355,471 | Rosenstein et al. | Aug. 8, 1944 |
| 2,403,317 | Warren | July 2, 1946 |
| 2,600,143 | Vaughn | June 10, 1952 |
| 2,623,867 | Dreyfus | Dec. 30, 1952 |
| 2,650,212 | Windemuth | Aug. 25, 1953 |
| 2,815,559 | Robinson | Dec. 10, 1957 |
| 2,853,472 | Schroeder | Sept. 23, 1958 |